(12) United States Patent
Flaig et al.

(10) Patent No.: US 11,027,499 B2
(45) Date of Patent: Jun. 8, 2021

(54) METHOD FOR CONNECTING HOLLOW PROFILES

(71) Applicant: Dr. Ing. h.c. F. Porsche Aktiengesellschaft, Stuttgart (DE)

(72) Inventors: Markus Flaig, Althengstett (DE); Philipp Scheiner, Eibelstadt (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 613 days.

(21) Appl. No.: 15/800,308

(22) Filed: Nov. 1, 2017

(65) Prior Publication Data

US 2018/0065313 A1 Mar. 8, 2018

Related U.S. Application Data

(62) Division of application No. 14/672,480, filed on Mar. 30, 2015.

(30) Foreign Application Priority Data

Apr. 2, 2014 (DE) ..................... 10 2014 104 638.2

(51) Int. Cl.
*B29C 65/70* (2006.01)
*B29C 70/46* (2006.01)
*B29C 70/76* (2006.01)
*B29C 70/84* (2006.01)
*B29C 70/86* (2006.01)
*B29C 70/68* (2006.01)
(Continued)

(52) U.S. Cl.
CPC ............ *B29C 65/70* (2013.01); *B29C 70/462* (2013.01); *B29C 70/682* (2013.01); *B29C 70/766* (2013.01); *B29C 70/78* (2013.01); *B29C 70/845* (2013.01); *B29C 70/86* (2013.01); *F16S 1/14* (2013.01); *B29K 2105/04* (2013.01); *B29K 2105/256* (2013.01); *B29L 2031/7502* (2013.01); *B62D 29/048* (2013.01); *Y10T 428/13* (2015.01)

(58) Field of Classification Search
CPC .. B62D 29/004; B62D 29/046; B62D 29/048; B62D 29/04; B29C 70/462; B29C 70/682; B29C 70/766; B29C 70/845; F16B 11/008
See application file for complete search history.

(56) References Cited

U.S. PATENT DOCUMENTS

2005/0050730 A1\* 3/2005 Marando .............. B22D 19/045
29/897.2
2007/0051465 A1\* 3/2007 Naughton ........... B29C 66/7212
156/305
(Continued)

FOREIGN PATENT DOCUMENTS

DE 4423642 C1 \* 10/1995 ....... B29C 66/72141
DE 102011017007 A1 \* 10/2012 ............. B29C 70/48

*Primary Examiner* — Jacob T Minskey
*Assistant Examiner* — Virak Nguon
(74) *Attorney, Agent, or Firm* — Gerald E. Hespos; Michael J. Porco; Matthew T. Hespos

(57) ABSTRACT

A method is provided for connecting hollow profiles (1-4) in a joint (10) to produce a load-bearing structure (5). The method includes placing ends of hollow profiles (1-4) in a mold and pressing the ends together with at least one semi-finished product to connect the ends of the hollow profiles to the semi-finished product.

8 Claims, 2 Drawing Sheets

(51) Int. Cl.
  *B29C 70/78* (2006.01)
  *B62D 29/04* (2006.01)
  *B29K 105/04* (2006.01)
  *B29K 105/00* (2006.01)
  *B29L 31/00* (2006.01)
  *F16S 1/14* (2006.01)

(56) References Cited

U.S. PATENT DOCUMENTS

2009/0162138 A1* 6/2009 Burger .................. B62D 27/02
  403/271
2014/0193192 A1* 7/2014 Eipper ................. B29C 70/845
  403/270

* cited by examiner

METHOD FOR CONNECTING HOLLOW PROFILES

CROSS REFERENCE TO RELATED APPLICATION

This application is a divisional of U.S. patent application Ser. No. 14/672,480, filed Mar. 30, 2015, which claims priority under 35 USC 119 to German Patent Appl. 10 2014 104 638.2 filed on Apr. 2, 2014, the entire disclosure of which is incorporated herein by reference.

BACKGROUND

1. Field of the Invention

The invention relates to a method for connecting hollow profiles in a joint to produce a load-bearing structure. The invention further relates to a load-bearing structure having hollow profiles that are connected firmly together with mutually facing ends in a joint. Moreover, the invention relates to a motor vehicle having a load-bearing structure of this type.

2. Description of the Related Art

DE 10 2008 061 463 A1 discloses a load-introduction device and a structural part that comprises at least one fiber composite part. The fiber composite part has at least one insert part that is connected to the structural part and forms a load path. The insert part is formed from a nonmetallic material. DE 10 2011 114 676 A1 discloses a fiber-reinforced plastic composite component with at least one fiber layer that is present in a composite with at least two matrix materials. The DE 10 2012 016 666 A1 discloses a joint element for connecting at least two hollow-profile beams composed of fiber-reinforced plastic in an angled manner. The joint element is formed from light metal or from plastic or from fiber-reinforced plastic.

It is the object of the invention to simplify the manufacture of stable load-bearing structures with hollow profiles that are connected firmly together with mutually facing ends in a joint.

SUMMARY OF THE INVENTION

The invention relates to a method for connecting hollow profiles in a joint to produce a load-bearing structure. The hollow profiles are placed with mutually facing ends in a mold and are pressed together with at least one semifinished product to connect the mutually facing ends of the hollow profiles firmly to the semi-finished product. The load-bearing structure preferably is a load-bearing structure of a motor vehicle. Adhesive can be used to connect the hollow profiles to the semi-finished product. However, adhesive is not used in other embodiments, for example if the semi-finished product contains resin that is not cured.

The semi-finished product may partially surround the mutually facing ends of the hollow profiles. The semifinished product can be molded, for example, so that openings that are open on one side are produced for the hollow profiles.

The semi-finished product may entirely surround the mutually facing ends of the hollow profiles. As a result, the method enables a form-fitting and cohesive connection between the hollow profiles and the semi-finished product. During manufacture, the semifinished products can be plugged with their mutually facing ends into openings in the semi-finished product to accommodate the half profiles.

The hollow profiles may be placed with their mutually facing ends in the mold and may be pressed together with at least one moldable and curable sheetlike fiber/plastic composite semi-finished product to connect the mutually facing ends of the hollow profiles firmly to the sheetlike fiber/plastic composite semifinished product during the molding and curing of the joint. The moldable and curable sheetlike fiber/plastic composite semifinished product contains for example a thermosetting plastic material that also is referred to as resin or thermoset material. The resin is initially in a liquid form and crosslinks during pressing, preferably under the action of heat, due to chemical reactions. The crosslinking also is referred to as curing. The resin creates a stable connection between the hollow profiles and the semi-finished product in a simple manner during pressing, or during crosslinking or curing, without the additional use of adhesives.

The sheetlike fiber/plastic composite semi-finished product may be a sheet molding compound SMC. During the processing of the sheet molding compound, a sheetlike semifinished product is brought into its final form by compression molding, for example extrusion, and cured. The semifinished product contains fibers that are contained in a tangled or sauerkraut-like manner in a carrier material. The carrier material contains curable resin. The fibers are for example carbon fibers.

The hollow profiles may be formed from a fiber/plastic composite material that may contain carbon fibers for reinforcement.

The hollow profiles may comprise a foam core, such as a plastic foam, in particular by a rigid foam. The foam core supports the hollow profile from the inside. As a result, the strength and rigidity of the hollow profiles is increased considerably in a simple manner. The increased stability achieved by the foam core enables a fiber content, in particular a carbon fiber content, to be reduced. Furthermore, the foam core prevents undesired collapsing of the hollow profiles under the pressure applied when the semi-finished product is pressed together with the hollow profiles. Thus, it advantageously is unnecessary to insert a core into the hollow profiles when the semifinished product is pressed together with the hollow profiles.

The semi-finished product may be formed from a similar material to or the same material as the hollow profiles. As a result, undesired thermal stresses in the load-bearing structure can be prevented because the materials have identical or similar coefficients of expansion.

The invention further relates to a load-bearing structure having hollow profiles that are connected firmly together with mutually facing ends in a joint by an above-described method. Thus, a very stable load-bearing structure can be produced in a simple manner.

The invention further relates to a motor vehicle having an above-described load-bearing structure. In this case, the weight of the motor vehicle can be reduced by the load-bearing structure.

Further advantages, features and details of the invention can be gathered from the following description, in which various exemplary embodiments are described in detail with reference to the drawings.

DETAILED DESCRIPTION OF THE PREFERRED EMBODIMENTS

Figure 1:
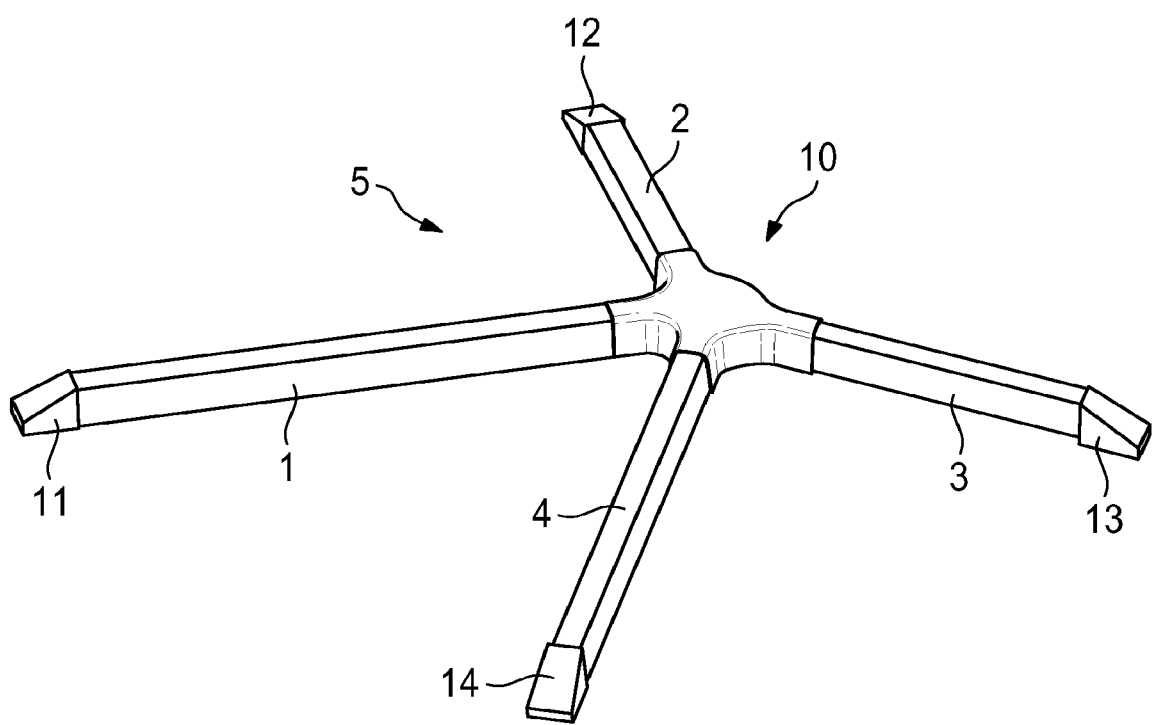
FIG. 1 is a perspective view of a load-bearing structure according to the invention having hollow profiles connected firmly with mutually facing ends in a joint.

Four hollow profiles 1 to 4 are illustrated in perspective in FIG. 1. To produce a load-bearing structure 5, the hollow profiles 1 to 4 are connected firmly together at their mutually facing ends in a joint 10. The hollow profiles 1 to 4 have end pieces 11 to 14 at their ends remote from the joint 10.

The end pieces 11 to 14 may serve to produce metal joints for attaching the load-bearing structure 5 to further (not illustrated) load-bearing structure elements. The metal joints are formed for example from aluminum or magnesium. In contrast thereto, the joint 10 is formed from a fiber-reinforced plastics material.

The hollow profiles 1 to 4 are formed from a carbon-fiber-reinforced plastics material. To increase stability, the hollow profiles 1 to 4 have a foam core in their interior. The foam core is preferably a rigid foam core made of a plastic material.

The hollow profiles 1 to 4 having the foam core are manufactured for example by pultrusion, prepreg compression molding or RTM. Pultrusion is the name given to a method in which fiber-reinforced plastic profiles can be produced quickly and easily.

Prepreg is the name given to a semifinished product having a plastic matrix in which fibers, in particular continuous fibers, are embedded. The plastic matrix is preferably a resin that is not yet cured.

The letters RTM stand for resin transfer molding and denotes a method also referred to as transfer molding. Compared with compression molding, a molding material is injected into a mold during transfer molding and cures under heat and pressure.

The hollow profiles 1 to 4 are supported from the inside by the foam core. As a result, the strength and rigidity of the hollow profiles 1 to 4 can be increased considerably. In addition, the fiber content of the hollow profiles 1 to 4 can be reduced because the foam core contributes to the stability.

A sheet molding compound SMC may be used to produce the joint 10. The sheet molding compound SMC advantageously contains carbon fibers. The carbon-fiber-containing SMC also is referred to as a C-SMC. The hollow profiles 1 to 4 can be connected firmly together by way of the SMC.

The connection between an SMC semifinished product and the hollow profiles 1 to 4 can be carried out by adhesive bonding. Particularly advantageously, however, the connection between the hollow profiles 1 to 4 and the SMC semifinished product is achieved by direct pressing of the SMC semifinished product together with the hollow profiles 1 to 4 placed in the mold.

The same material preferably is used to produce the hollow profiles 1 to 4 and the SMC semifinished product during the manufacture of the joint 10. As a result, undesired stresses in the finished load-bearing structure 5 can be prevented. Furthermore, on account of the press fit, the application of the adhesive can be dispensed with.

Figure 2:
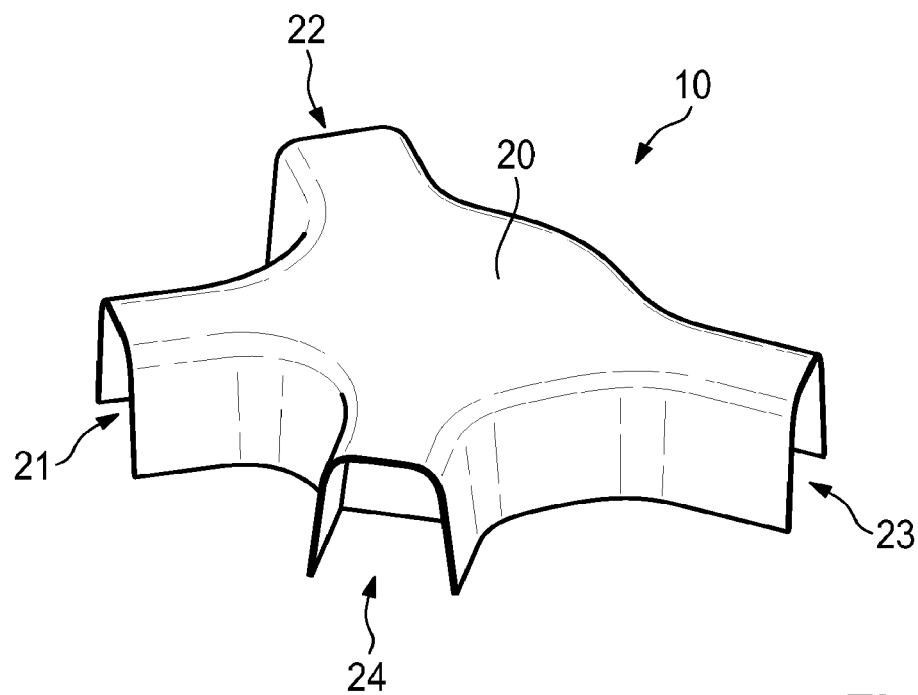
FIG. 2 is a perspective view of an embodiment of the joint of FIG. 1.

A composite body 20 that can produce the joint 10 is illustrated in perspective in FIG. 2. The composite body 20 has a total of four openings 21 to 24 that can accommodate the mutually facing ends of the hollow profiles 1 to 4 in FIG. 1.

The openings 21 to 24 are open on their underside. This makes it easier to place the hollow profiles 1 to 4 in the mold with the composite body 20. During placing in the mold (not illustrated), the composite body preferably is arranged with its underside up.

Figure 3:
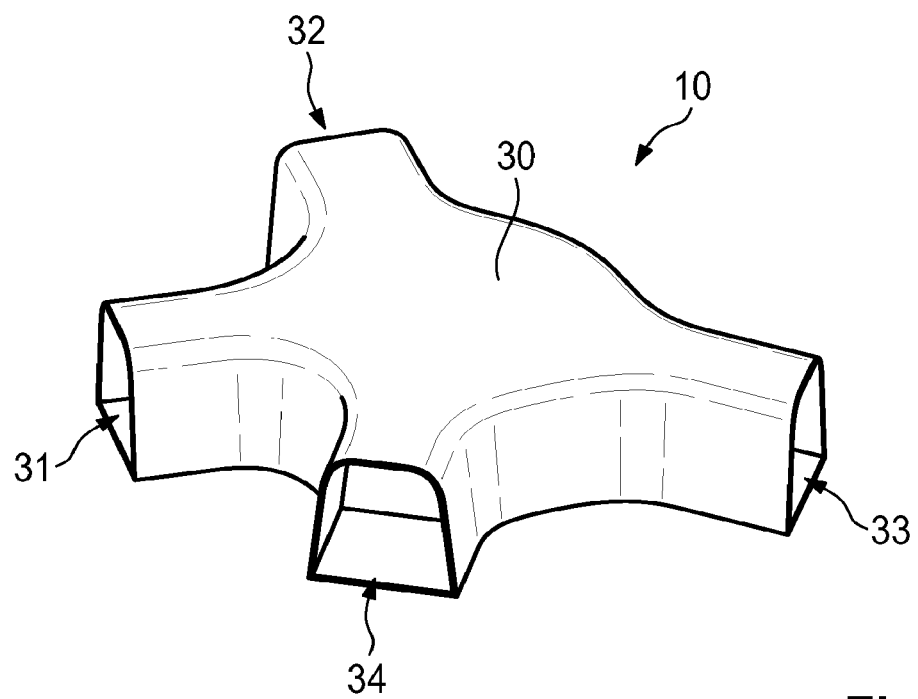
FIG. 3 is a perspective view of a variant of the joint from FIG. 2.

A composite body 30 that also can be used to produce the joint 10 in FIG. 1 is illustrated in perspective in FIG. 3. The composite body 30 comprises a total of four openings 31 to 34 to accommodate the mutually facing ends of the hollow profiles 1 to 4. In contrast to the composite body 20 illustrated in FIG. 2, the openings 31 to 34 in the composite body 30 illustrated in FIG. 3 entirely surround the mutually facing ends of the hollow profiles 1 to 4.

During the manufacture of the load-bearing structure 5, the hollow profiles 1 to 4 easily are plugged with their mutually facing ends into the openings 31 to 34 in the composite body 30. The hollow profiles 1 to 4 in the plugged-in state then are pressed together with the composite body 30 and preferably heated to produce, or cure or crosslink, the joint 10 in FIG. 1.

What is claimed is:

1. A method for producing a load-bearing structure, comprising:
    providing a semi-finished composite body having a plurality of plug-in regions each of which has an open end and one open side, the semi-finished composite body being formed from a first fiber/plastic composite material;
    placing the semi-finished composite body in a mold;
    placing ends of profiles in the open sides of the plug-in regions of the semi-finished composite body, each of the profiles having a hollow portion formed from a second fiber/plastic composite material and a rigid foam core filling and reinforcing all of the respective hollow portion; and
    pressing the plug-in regions of the semi-finished composite body together with the ends of the profiles in the plug-in regions of the composite body in the mold to connect a plurality of sides of the ends of the profiles firmly to the semi-finished composite body; and
    heating the regions of the semi-finished composite body that have been pressed to the ends of the profiles sufficiently to cross link plastic of the first fiber/plastic composite material to plastic of the second fiber/plastic composite material to form the load-bearing structure.

2. The method of claim 1, wherein the semi-finished product comprises at least one moldable and curable sheet-like fiber/plastic composite semi-finished product, the step of pressing comprising connecting the ends of the profiles to the sheet-like fiber/plastic composite semi-finished product in the mold and curing.

3. The method of claim 2, wherein the sheet-like fiber/plastic composite semi-finished product is a sheet molding compound.

4. The method of claim 1, wherein the second fiber/plastic composite material comprises carbon fibers.

5. The method of claim 1, wherein the semi-finished product is formed from a similar material to or the same material as the profiles.

6. The method of claim 1, further comprising mounting end pieces onto ends of the profiles remote from the semi-finished composite body.

7. The method of claim 1, wherein the end pieces are formed from metal.

8. The method of claim 7, wherein the end pieces are formed from magnesium or aluminum.

\* \* \* \* \*